United States Patent Office

3,358,703
Patented Dec. 19, 1967

3,358,703
METHOD FOR SEALING LEAKS
Irwin Ginsburgh, Morton Grove, Ill., assignor to Standard Oil Company, Chicago, Ill., a corporation of Indiana
No Drawing. Filed Dec. 20, 1965, Ser. No. 515,195
4 Claims. (Cl. 137—15)

This invention relates to a method for sealing leaks in fluid carrying conduits. The invention more particularly concerns a method for sealing leaks in fluid carrying conduits, while the conduit is transporting fluid, by introducing to the conduit, upstream of the suspected leak, wood sawdust particles to the fluid flowing in the conduit.

Losses resulting from undetected leaks in industrial operations such as hydrocarbon refining, chemical processing, water treating, and pipeline transportation and storage operations are of substantial economic importance. The Oil and Gas Journal, March 3, 1939, page 104, indicated the magnitude of utility leaks. A few illustrations from the data presented in the Journal will demonstrate the significance of leaks. A 2 drop per second leak in an oil line will lose 30 barrels of oil per year. A three-eighth inch opening in an oil line will lose approximately 3,708 barrels of oil per year. A one-half inch opening in a fuel gas line under 20 p.s.i. will lose 5,420,000 cubic feet per month. Steam under 140 p.s.i. will escape through a one-eighth opening at the rate of 68,000 pounds per month.

Leaks are often difficult to detect, particularly, if a conduit is buried or insulated. By the time hidden leaks are detected by inventory losses, or become virtually detectable, many barrels of valuable product may be lost. Even after detection, the cost of locating the leak and digging up a buried conduit to replace or repair a section of the conduit to eliminate leaks, is extremely high. Additional economic losses are incurred when the conduit must be blocked off and operation ceased while leaks are being repaired. Therefore, it is desirable to seal leaks in fluid carrying conduits without uncovering buried conduits to find and repair the leak, and without ceasing flow through the conduit. In addition to the economic losses resulting from small leaks, they create a hazard in industries where volatile, explosive, or corrosive fluids are employed. Small undetected leaks may saturate the media surrounding the conduit, causing an acute fire hazard. Similarly, corrosive or deleterious liquids may seep from small leaks in the conduit and result in injury to personnel and destruction of equipment.

Leak plugging techniques utilizing wood sawdust particles as the leak sealant material are well known in the art. It has been found, however, that when such particles are used in liquid carrying systems, which are operating at superatmospheric pressures, that the natural buoyancy or floatability characteristics of the particles is destroyed by the rapid impregnation of the cellular structure with the liquid into which the particles are introduced. Effective sealing of leak openings in the upper portions of liquid carrying conduits can only be obtained when the sealant material is buoyant in the liquid otherwise the sealant material will not be available to plug the leak. Leaks occurring in the upper tubes in the conventional tube-type heat exchangers are extremely difficult to plug internally. If the sealant material has insufficient buoyancy, it will tend to collect in the lower regions of the heaters or in the lower tubes and never reaching the leaking area. Therefore, when sawdust is used as the leak sealant material in such liquid carrying systems, it is ineffectual because it sinks to the bottom of the conduit.

It has been discovered that the impregnation of substantially dry wood sawdust particles with a gaseous fluid prior to the introduction of such particles into the liquid flowing in liquid carrying conduits renders such particles buoyant and floatable at the operating pressures in the liquid carrying system. Further, the rate at which such particles absorb the liquid after introduction thereto is substantially reduced. The gas impregnation of the substantially dry sawdust can be effected by simply soaking the sawdust particles in a pressurized vessel in the presence of a gaseous fluid under superatmospheric pressure. For example, it has been found that soaking dry sawdust in the presence of air or nitrogen at 100 pounds p.s.i. for a period of from about 10 to about 60 minutes effectively produces a floatable or buoyant sawdust that can be used to plug leaks occuring in the upper tubes of an eight-foot diameter heat exchanger, when the gas impregnated particles are introduced into the water side operating at 40 p.s.i. pressure of such exchangers. Accordingly, this invention provided an improved method for utilizing wood sawdust particles as effective leak sealant material for plugging leaks in all types of liquid carrying conduits operating at superatmospheric pressure.

Broadly, in accordance with the invention, there is provided an improvement in the method of sealing leaks in liquid carrying conduits being operated at superatmospheric pressures wherein wood sawdust particles are introduced into the liquid in said liquid carrying conduit upstream of said leak and carried downstream in said liquid to the area of said leak where said particles are drawn into the opening in the conduit causing the leak by the sideflow resulting from the leak whereby said particles become lodged in said opening sealing said leak which comprises the step of impregnating said wood particles with a gaseous fluid prior to introduction of said particles to said liquid carrying conduit whereby said particles are floatable in said liquid in said conduit. When a gaseous fluid, which is incompatible with the liquid flowing in the liquid carrying conduit, is used as the impregnating fluid the sawdust particles are buoyant and floatable in the liquid at the pressure existent in the liquid carrying system. The prefered gaseous fluids are air, carbon dioxide, and nitrogen. Impregnation of the wood sawdust particles with the gaseous fluids is simply effected by soaking substantially dry particles in a pressurized vessel containing the fluid at superatmospheric pressure. Preferably, the impregnation is conducted at pressures above the liquid pressure in the liquid existent in the liquid carrying conduit system. Impregnating pressures in the range of about 50 to 100 pounds per square inch have been found adequate for producing particles having suitable buoyancy for use as leak sealant materials in pressurized liquid carrying conduits. It will be understood by those skilled in the art that simple qualitative tests can be used to ascertain suitable impregnating pressures and times to obtain the desired buoyancy in the particles.

After the wood sawdust particles having the desired physical dimensions have been impregnated with a gaseous fluid, the gas impregnated particles are introduced to the liquid carrying conduit upstream of the area of the suspected leak. Generally, the wood sawdust particles comprise a mixture of particles having varying dimensions. The size of the pipe will determine the major dimension of the particles. As a general rule, such major dimensions should not be greater than about ⅓ the diameter of the conduit to which the particles will be introduced. It has been found that the particles will remain dispersed within the liquid and travel downstream for at least several thousand feet. Therefore, the injection point may be some distance upstream at a gate valve or other suitable access point to the conduit. An advantageous procedure for introducing the particles to a pressurized conduit utilizes an upstream gate valve. The particles are placed in a holding pipe, and the pipe is then filled with liquid. The holding pipe is attached to the gate valve. A means for exerting pressure within the holding pipe is provided at the pendant end of the pipe. A tank of gas such as nitrogen and a quick opening valve are advantageously employed to produce a burst of pressure within the holding pipe. After attaching the holding pipe to the gate valve, the gate valve is opened while the quick opening valve controlling the nitrogen pressure remains closed. The quick opening valve is then opened permitting a burst of gas pressure to drive the liquid containing the particles from the holding pipe, through the gate valve and into the conduit.

The flow rate of the liquid within the conduit has been found to be related to the effectiveness of the present invention. Flow rates below about 1 foot per second tended to cause the particles to settle out of the liquid, rather than maintain a random distribution within the liquid. This is undesirable because it inhibits the particles from becoming lodged in leak opening in the upper portion of the conduit. If the flow rate is excessive, upwards of 50 feet per second the velocity of the liquid tends to drive the particles past small openings in the conduit and prevents the particles from effectively being pulled to the opening causing the leak. Optimum flow rates for maximum effectiveness of the leak plugging procedure of the present invention have been found to be about 2.0 to about 20 feet per second. Pressures within the conduit may vary from about 5 p.s.i. to at least about 1,000 p.s.i. without substantially affecting the invention. However, it is preferred that a conduit pressure of at least 20 p.s.i. be maintained during the leak plugging procedure.

The leak plugging technique is not materially affected by the viscosity of the liquid flowing in the conduit. Experiments have shown the procedure to operate effectively in liquids ranging from water to heavy oils.

The quantity of particles employed in the leak plugging method of the present invention varies with the diameter of the conduit. For a conduit of 6 inches in diameter, it has been found desirable to use about one-half cup of random sized and shaped particles. An increase in the quantity of particles employed in treating a conduit of a given size will increase the probability that particles will be drawn to an opening in a conduit which causes the leak. It is believed that the quantity of particles employed should increase directly with the cross-sectional area of the conduit under treatment.

Only a relatively small quantity of particles are required to effectively close a high percentage of the leaks in a conduit. This small amount of particles will generally be insufficient to create serious contamination problems.

However, should it be necessary to remove the particles from a stream, removal may be accomplished by inserting a strainer or filter at a point downstream from the injection.

I claim:

1. In the method of sealing leaks in liquid carrying conduits being operated at superatmospheric pressures wherein wood sawdust particles are introduced into the liquid in said liquid carrying conduit upstream of said leak and carried downstream in said liquid to the area of said leak where said particles are drawn into the opening in the conduit causing the leak by the sideflow resulting from the leak whereby said particles become lodged in said opening sealing said leak, the improvement comprising the step of impregnating said wood particles with a gaseous fluid prior to introduction of said particles to said liquid carrying conduit whereby said particles are floatable in said liquid in said conduit.

2. The step in claim 1 wherein said gaseous fluid is air.

3. The step in claim 1 wherein said gaseous fluid is nitrogen.

4. The step in claim 1 wherein said impregnating is effected at superatmospheric pressures in the range of about 50 to 100 pounds per square inch.

No references cited.

ALAN COHAN, *Primary Examiner.*